US009755918B2

(12) United States Patent
Sonoda et al.

(10) Patent No.: US 9,755,918 B2
(45) Date of Patent: Sep. 5, 2017

(54) COMMUNICATION TERMINAL, METHOD OF COMMUNICATION AND COMMUNICATION SYSTEM

(75) Inventors: Kentaro Sonoda, Tokyo (JP); Yasuhiro Mizukoshi, Tokyo (JP); Hideyuki Shimonishi, Tokyo (JP); Yoichi Hatano, Tokyo (JP); Masayuki Nakae, Tokyo (JP); Masaya Yamagata, Tokyo (JP); Yoichiro Morita, Tokyo (JP); Takayuki Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 35 days.

(21) Appl. No.: 14/345,218

(22) PCT Filed: Sep. 14, 2012

(86) PCT No.: PCT/JP2012/005916
§ 371 (c)(1),
(2), (4) Date: Mar. 14, 2014

(87) PCT Pub. No.: WO2013/038712
PCT Pub. Date: Mar. 21, 2013

(65) Prior Publication Data
US 2015/0078169 A1 Mar. 19, 2015

(30) Foreign Application Priority Data
Sep. 16, 2011 (JP) ................................. 2011-203276

(51) Int. Cl.
*H04L 1/00* (2006.01)
*H04L 12/26* (2006.01)
(Continued)

(52) U.S. Cl.
CPC ............ *H04L 43/028* (2013.01); *H04L 47/14* (2013.01); *H04L 47/32* (2013.01)

(58) Field of Classification Search
None
See application file for complete search history.

(56) References Cited

U.S. PATENT DOCUMENTS

2012/0120964 A1\* 5/2012 Koponen ............ H04L 41/0816
370/409

FOREIGN PATENT DOCUMENTS

| CN | 102025622 A | 4/2011 |
| JP | 2003-298628 | 10/2003 |
| JP | 2008-294895 | 12/2008 |

OTHER PUBLICATIONS

International Search Report Corresponding to PCT/JP2012/005916, dated Oct. 16, 2012; 2 pages.
(Continued)

*Primary Examiner* — Kouroush Mohebbi
(74) *Attorney, Agent, or Firm* — Wilmer Cutler Pickering Hale and Dorr LLP

(57) ABSTRACT

A communication terminal comprises: first means that communicates with a network system that includes a forwarding apparatus forwarding a packet and a control apparatus informing the forwarding apparatus of a processing rule prescribing a packet processing method; second means that determines a processing operation to be executed by the network system from among packet processing operations to be executed by the communication terminal; and third means that informs the forwarding apparatus of a processing rule corresponding to the determined packet processing operation.

27 Claims, 11 Drawing Sheets

(51) Int. Cl.
*H04L 12/823* (2013.01)
*H04L 12/801* (2013.01)

(56) References Cited

OTHER PUBLICATIONS

Higuchi, S., "Cataclysmic Changes in Network Industries—to the Next-Generation Cloud Computing," Software Design, Gijutsu-Hyohron Co., Ltd., No. 249, Jul. 18, 2011; 8 pages.
McKeown, N. et al., "OpenFlow: Enabling Innovation in Campus Networks", Mar. 14, 2008; 6 pages.
"OpenFlow Switch Specification", Version1.1.0 Implemented (Wire Protocol 0x02), Feb. 28, 2011; pp. 1-56.
Written Opinion corresponding to PCT/JP2012/005916, mailing date Oct. 16, 2012, 3 pages.
Chinese Office Action issued in corresponding Chinese Application No. 201280045297.2, dated Nov. 25, 2015, 17 pages.
OpenFlow Consortium "OpenFlow Switch Specification", Version 1.0.0 (Wire Protocol 0x01), Dec. 31, 2009, http://OpenFlowSwitch.org, pp. 1-42.

\* cited by examiner

COMMUNICATION TERMINAL, METHOD OF COMMUNICATION AND COMMUNICATION SYSTEM

CROSS-REFERENCE TO RELATED APPLICATION

The present application is a national stage application of International Application No. PCT/JP2012/005916 entitled "Communication Terminal, Method of Communication and Communication System," filed on Sep. 14, 2012, which claims priority from Japanese Patent Application No. JP2011-203276, filed on Sep. 16, 2011. The contents of both applications are hereby incorporated in their entireties by reference into this specification.

This invention relates to a communication technique in which a control apparatus manages centralized control on packet processing performed on a network system.

BACKGROUND

Technical Field

Communication terminals, such as servers or mobile terminals, execute a variety of packet processing operations. To reduce the load of packet processing imposed on the communication terminals, a variety of techniques have so far been proposed. For example, Patent Literature 1 shows a communication terminal in which the processing of packet filtering is divided into processing by software and that by hardware to relieve the load of packet filtering otherwise imposed on the communication terminal itself. By dividing the processing of the packet filtering in this manner, it is possible with the communication terminal of Patent Literature (PTL) 1 to reduce the load of the packet filtering.

PTL 1:
JP-Patent Kokai JP-A-2008-294895
NPL 1:
Nick McKeown and seven others, "OpenFlow: Enabling Innovation in Campus Networks," [online], [retrieved on Heisei23 (2011), Sep. 8], the Internet <URL: http://www.openflow.org/documents/openflow-wp-latest.pdf>.
NPL 2:
"OpenFlow Switch Specification," Version 1.1.0 Implemented (Wire Protocol 0x02), [online], [retrieved on Heisei23 (2011), Sep. 8], the Internet <URL: http://www.openflow.org/documents/openflow-spec-v1.1.0.pdf>.

SUMMARY

The disclosure of the aforementioned Patent Literature and the Non-Patent Literatures is incorporated herein by reference thereto. The following analysis is given by the present invention. With the technique disclosed in Patent Literature 1, it is possible to reduce the load of packet processing otherwise imposed on the communication terminal itself.

It is true that, in the method of the Patent Literature 1, the load of the packet processing which should be imposed on the communication terminal may be reduced. However, the processing of packet filtering itself in the communication terminal may not be dispensed with. Thus, in the technique disclosed in the Patent Literature 1, the load in the processing of the packet processing, executed by the communication terminal, may not be relieved sufficiently, such that there is room for improvement.

Similar problems may arise in communication terminals where not only the processing of packet filtering but also the processing of various sorts, such as address changes, header rewrite, packet analysis or the like, is carried out.

In view of the above mentioned deficiencies of the related technique, there is a need in the art to provide a communication terminal, a communication method and a communication system, according to which the load of packet processing at a communication terminal may appreciably be reduced.

According to a first aspect of the present disclosure, there is provided a communication terminal comprising:
a first unit that communicates with a network system including a forwarding apparatus forwarding a packet and a control apparatus informing the forwarding apparatus of a processing rule prescribing a packet processing method;
a second unit that determines a processing operation to be executed by the network system from among packet processing operations to be executed by the communication terminal; and
a third unit that informs the forwarding apparatus of a processing rule corresponding to the determined packet processing operation.

According to a second aspect of the present disclosure, there is provided a method of communication, by a communication terminal communicating with a network system that includes a forwarding apparatus forwarding a packet and a control apparatus informing the forwarding apparatus of a processing rule prescribing a packet processing method; the method comprising:
determining a processing operation to be executed by the network system from among packet processing operations to be executed by the communication terminal; and
informing the forwarding apparatus of a processing rule corresponding to the determined packet processing operation.

The present method is bound up with a particular machine, namely the above mentioned communication terminal connected to the network.

According to a third aspect of the present disclosure, there is provided a communication system comprising:
a forwarding apparatus that forwards a packet;
a control apparatus that informs the forwarding apparatus of a processing rule prescribing a packet processing method; and
a communication terminal, wherein
the communication terminal comprises:
a first unit that communicates with a network system including the forwarding apparatus and the control apparatus;
a second unit that determines a processing operation to be executed by the network system from among packet processing operations to be executed by the communication terminal; and
a third unit that informs the forwarding apparatus of a processing rule corresponding to the determined packet processing operation.

The present invention provides the following advantage, but not restricted thereto. According to the present disclosure, the packet processing, which should be carried out by the communication terminal, is taken charge of by a network system side, operating as proxy, thus appreciably reducing the load otherwise imposed by packet processing on the communication terminal side.

PREFERRED MODES

Figure 1:
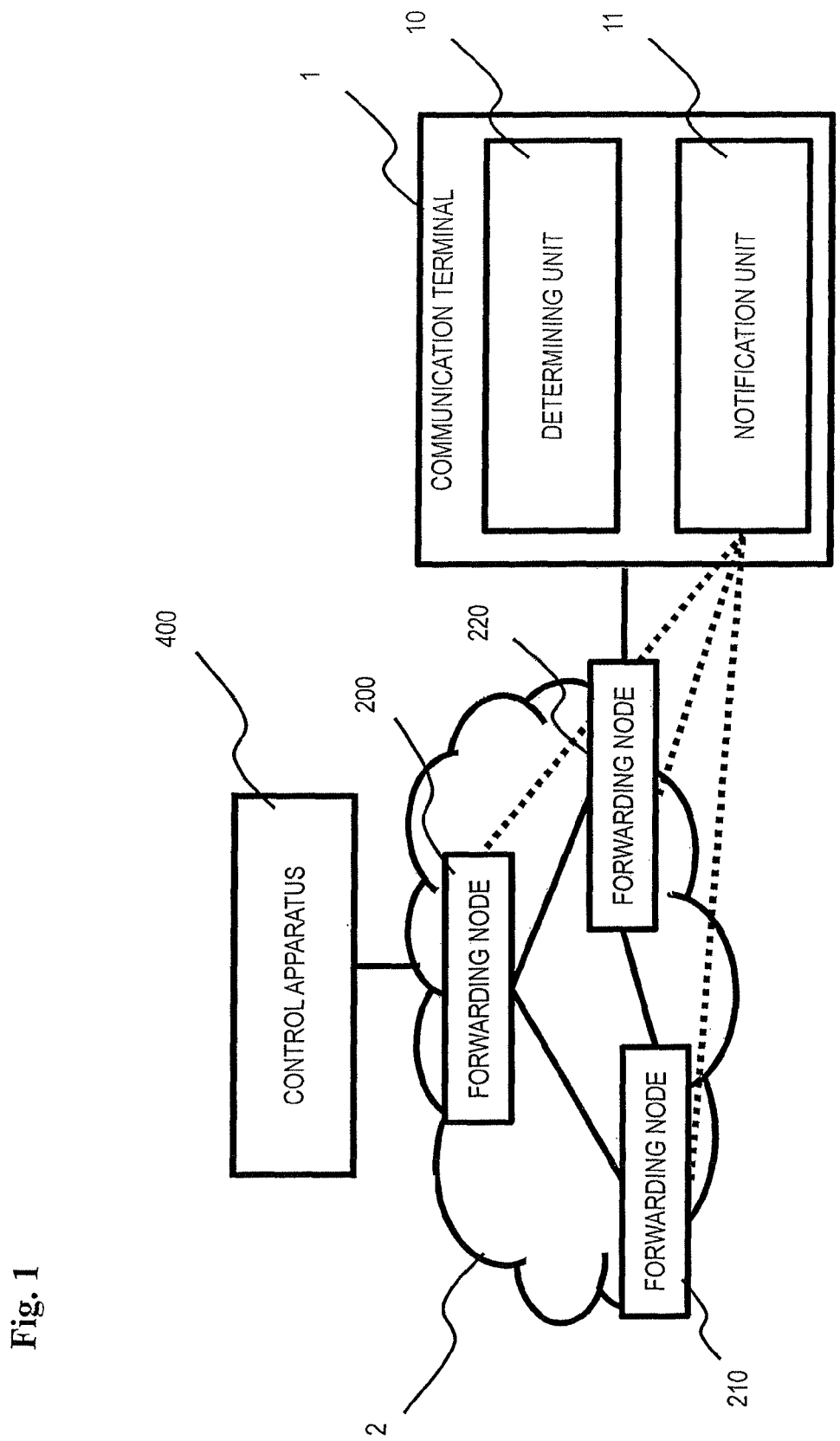
FIG. 1 is a schematic view showing an example system configuration according to an exemplary embodiment of the present invention.

In the present disclosure, there are various possible modes, which include the following, but not restricted thereto. Initially, the sum of an exemplary embodiment of the present disclosure will be explained. It should be noted that respective elements are denoted by reference signs of the drawings only for convenience to assist in the understanding and are not intended to restrict the disclosure to the mode shown in the drawings.

A communication terminal of the present disclosure (reference sign 1 in FIG. 1) is connectable to a network system (reference sign 2 of FIG. 1). The network system has an architecture in which a control apparatus (reference sign 400 of FIG. 1) manages centralized control of packet forwarding by forwarding apparatus, such as switches or routers (forwarding nodes 200, 210, 220 of FIG. 1). The communication terminal of the present disclosure (reference sign 1 of FIG. 1) causes the network system (reference sign 2 of FIG. 1) to carry out by proxy the packet processing which otherwise should be carried out by the communication terminal (reference sign 1 of FIG. 1). Thus, according to the present disclosure, the load of packet processing, otherwise imposed on the communication terminal (reference sign 1 of FIG. 1), may appreciably be reduced.

As example architecture of the centralized control, there is a technique termed an open-flow (OpenFlow). See Non-Patent Literatures (NPLs) 1 and 2. With the OpenFlow, communication is grasped as an end-to-end flow, and path control as well as recovery from failures is performed on the flow-by-flow basis. An OpenFlow switch, stated in the specification in Non-Patent Literature 2, includes a secure channel for communication with an OpenFlow controller, as a control apparatus, and is set into operation in accordance with a flow table, addition to or correction of which is commanded by the OpenFlow controller. In the flow table, a set composed by a match field (matching rules), stating the conditions of matching to a packet header, the flow statistic information (Counters), and by an instruction which has defined processing contents, is defined from one flow to another. See FIG. 11.

On receipt of a packet, the OpenFlow switch retrieves, from the flow table, an entry including a match field matched to the header information of the received packet. If, as a result of the retrieval, an entry matched to the received packet is found, the OpenFlow switch updates the flow statistic information (Counter), while executing processing contents stated in the instruction field of the entry of the received packet, viz., sending the packet at a specified port or carrying out packet flooding/drop. If, as a result of the retrieval, no entry matched to the received packet has been found, the OpenFlow switch sends the received packet to the OpenFlow controller over the secure channel. The OpenFlow controller determines a route for the packet, based on the information on the transport source as well as the transport destination of the packet, and sets a flow entry corresponding to the path, thus decided on, in the OpenFlow switch. In this manner, the OpenFlow switch uses the entry stored in the flow table as the processing rule to forward the packet.

It should be noted that the architecture of the centralized control is not limited to the OpenFlow described above. It is only sufficient that the architecture is of the centralized control type.

The following describes an example of the system configuration with reference to FIG. 1. It should be noted that the configuration shown in FIG. 1 is exemplary only and that the system configuration of the present disclosure is not limited to the configuration shown in FIG. 1.

A network system 2 comprises forwarding nodes 200, 210 and 220 controlled by a control apparatus 400 under centralized control. It should be noted that a node(s) not controlled by the control apparatus 400 may also be included in the network system 2.

The control apparatus 400 sets, for at least one of the forwarding nodes 200, 210 and 220, a set of processing rules that stipulate the packet processing method. The control apparatus 400, so setting the processing rules for the forward processing for the forwarding nodes, executes centralized management of e.g., the packet forward processing operations by the forwarding nodes.

A communication terminal 1 includes a communication function that corresponds to the above mentioned first means (or unit), and communicates with the network system 2 constructed by the forwarding nodes controlled by the control apparatus 400 by centralized control. The system under which the communication terminal 1 communicates with the network system 2 may be any system, for example, a wired communication system or a wireless communication system. Viz., the communication terminal 1 may take the form of any of a variety of network appliances, such as server, personal computer, mobile terminal, router or mobile router.

A determining unit 10 corresponds to the above mentioned second means (or unit), and decides on a processing operation, the communication terminal 1 is caused to execute, from among processing operations otherwise executed by the communication terminal 1. For example, the determining unit 10 determines the processing operation of dropping the packet, sent from a specified transport source to the communication terminal 1, as the processing to be executed by the network system 2.

A notification unit 11 corresponds to the above mentioned third means (or unit), and informs at least one of the forwarding nodes 200, 210 and 220 about processing rules pertinent to the processing operation as determined by the determining unit 10. For example, if the processing operation determined is that of dropping a packet matched to a certain condition for discrimination, the notification unit 11 informs at least one of the forwarding nodes 200, 210 and 220 about the processing rules including the condition of discriminating the packet to be dropped and an instruction to drop the packet matching to the condition of discrimination.

The determining unit 10 also decides on the processing of controlling the traffic based on the volume of communication of packets sent or received by the communication terminal 1, for example, the processing of dropping a packet(s) in case the communication volume exceeds a pre-set threshold value, as being the processing to be executed by the network system 2. In this case, the notification unit 11 generates the following processing rules, based on the information for discrimination of the communication terminal 1, such as terminal address, the condition pertinent to the communication volume, such as threshold value, or on the traffic controlling methods, such as packet dropping. First, the notification unit 11 informs at least one of the forwarding nodes 200, 210 and 220 about the matching rules, specifying the conditions for discrimination of packets sent and received by the communication terminal 1, and about the processing rules stipulating that the communication volume of packets matching to the matching rules is to be monitored. Second, the notification unit 11 informs at least one of the forwarding nodes 200, 210 and 220 about the processing rules providing for processing in conformity to the monitored communication volume. At least one of the forwarding nodes 200, 210 and 220, in which these processing rules have been set, executes the processing of dropping a packet or changing the packet communication route to a route of narrower bandwidth, in case the processing volume has exceeded the pre-set threshold value, in accordance with the above mentioned processing rules.

The above mentioned processing operations, decided on by the determining unit 10, are merely illustrative, such that any other suitable processing operations may be decided on by the determining unit 10.

The determining unit 10 may decide on the above mentioned processing operations based on pre-set policies, such as load or communication volume of the communication terminal 1, time zones in which the communication terminal 1 is used, or whether or not a packet in question matches to a pre-set condition. For example, the determining unit 10 decides on the processing of dropping a packet, sent from a specified transport source to the communication terminal 1, depending on the load on the communication terminal 1, as being the processing to be executed by the network system 2.

It is also possible for the notification unit 11 to set the term of validity on the processing rules to be notified to at least one of the forwarding nodes 200, 210, 220 so that the processing rules will become non-valid after the term of validity has lapsed.

In the communication terminal 1 of the present disclosure, the packet processing to be executed by the communication terminal 1 is executed on the network which then operates as proxy. It is thus possible with the present disclosure to appreciably reduce the load of packet processing which should otherwise be executed in the communication terminal 1.

On the other hand, the load on the control apparatus 400 may also be reduced since the processing rules are generated by the communication terminal 1 to take the place of the control apparatus 400 and the so produced processing rules are notified to the forwarding nodes.

First Exemplary Embodiment

A first exemplary embodiment will now be described with reference to FIG. 2. In the first exemplary embodiment, a communication terminal 1 causes a network system 2 to execute access control processing depending on the access state from an access source apparatus 100.

Figure 2:
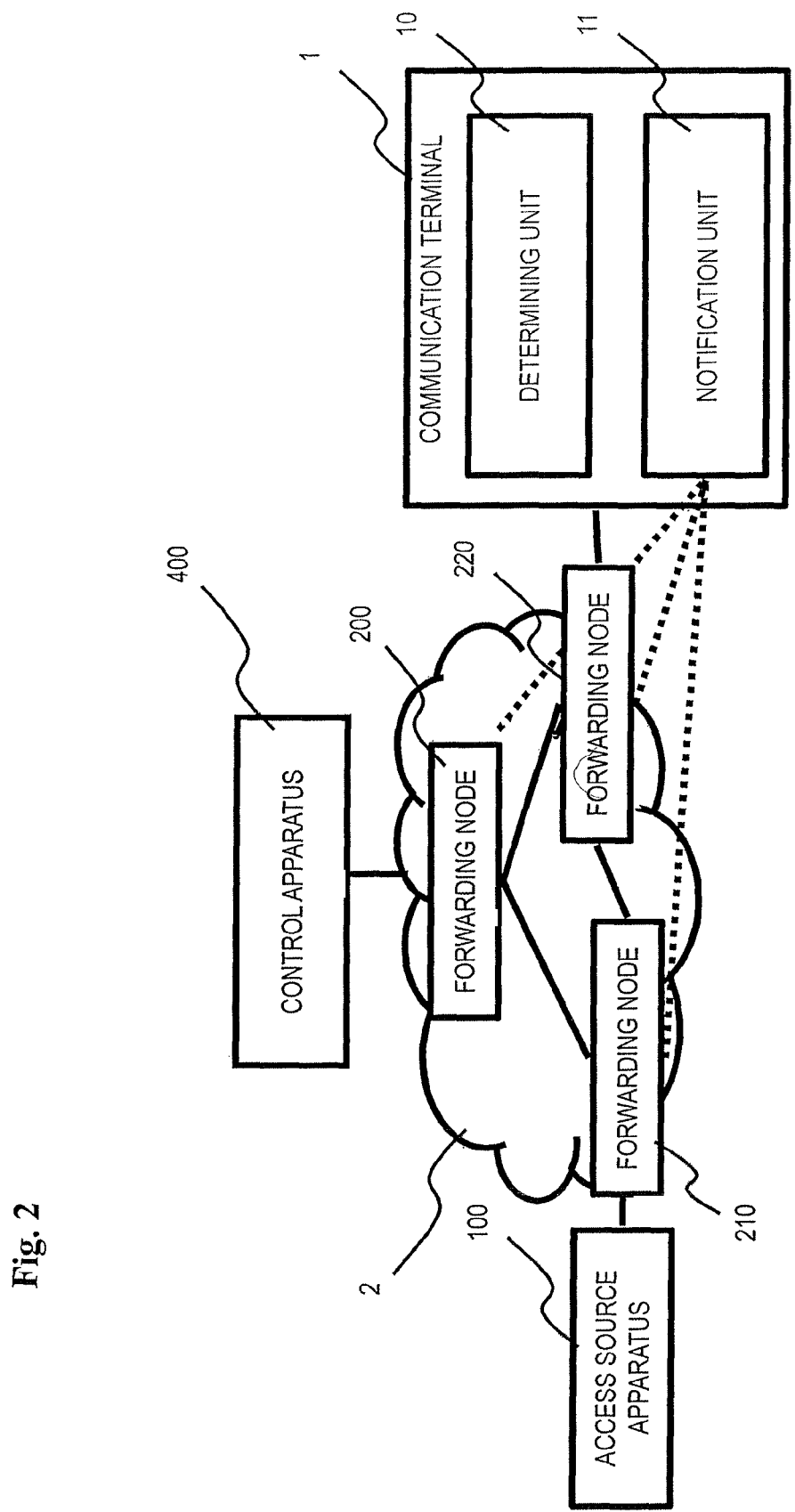
FIG. 2 is a schematic view showing an example system configuration according to a first exemplary embodiment of the present invention.

FIG. 2 shows a configuration including a plurality of forwarding nodes 200, 210 and 220 and a control apparatus 400. The forwarding nodes perform the processing of forwarding packets sent from the access source apparatus 100 to the communication terminal 1, whilst the control apparatus 400 sets the processing rules in these forwarding nodes. It should be noted that the system configuration of FIG. 2 is merely illustrative and the configuration of the present disclosure is not limited to the configuration shown in FIG. 2.

The forwarding nodes 200, 210 and 220 process received packets in accordance with processing rules that correlate the matching rules, to match received packets against, with the processing contents to be applied to the packet matched to the matching rules.

Figure 3:
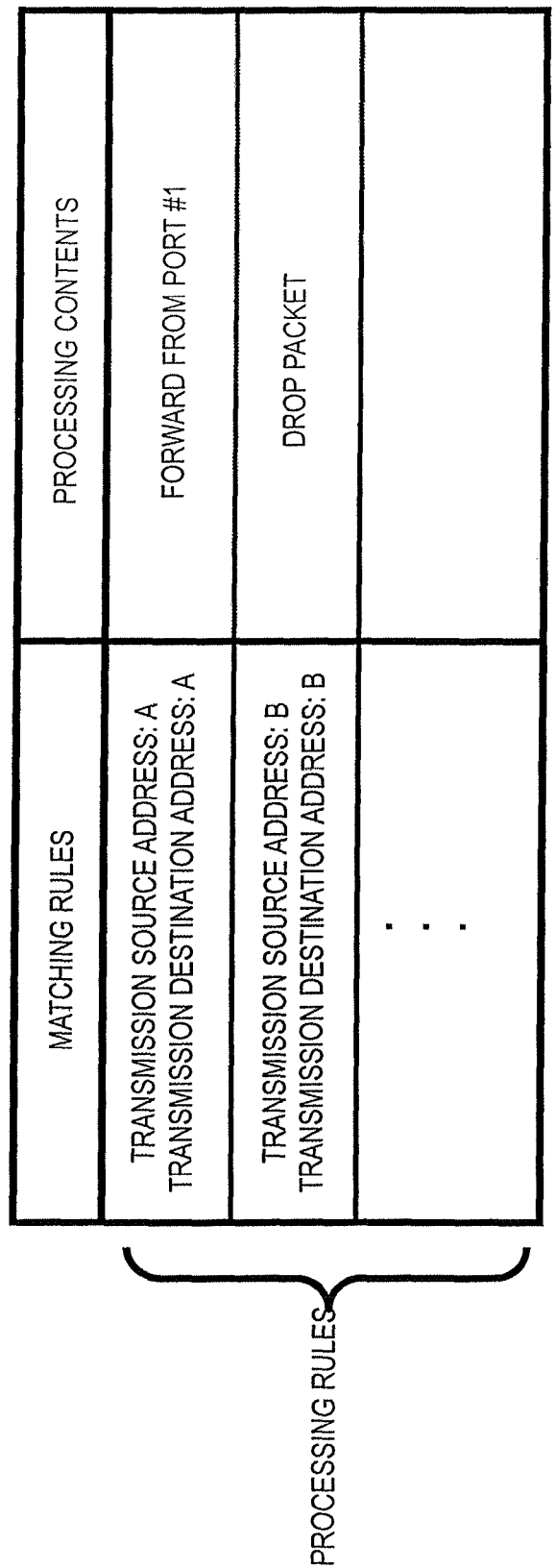
FIG. 3 is a tabulated diagram showing example processing rules.

FIG. 3 shows example processing rules. The forwarding nodes 200, 210 and 220 refer to the table, having the processing rules stored therein, to determine whether or not the packet received matches to the condition provided in the matching rules (for example, the condition that the transmission source address is A and the transmission destination address is a). If the processing rule matching to the matching rule has been found, the forwarding nodes 200, 210 and 220 process the packets in accordance with the processing contents corresponding to the matching rules.

Figure 11:
FIG. 11 is a diagram for illustrating the legacy technique.

The forwarding nodes 200, 210 and 220 may be Open-Flow switches of Non-Patent Literature 2 operating with the flow entries of FIG. 11 as the processing rules.

In an example of FIG. 2, the communication terminal 1 is attached to the forwarding node 220, with the access source apparatus 100 communicating with the communication terminal 1 via the forwarding nodes 200, 210 and 220.

The communication terminal is an access destination for the access source apparatus 100. The communication terminal 1 may, for example, be any of larger numbers of communication equipment, such as Web servers, databases, mobile communication terminals, PCs, or VMs (Virtual Machines) running inside the PCs.

A determining unit 10 of the communication terminal 1 identifies the access source apparatus 100, having vast amounts of transport hysteresis, using the log information exemplified by the number of times of accesses to the communication terminal 1 or the packet volumes. The determining unit 10 identifies the access source information to uniquely determine the access source apparatus 100, such as IP address, MAC address or the machine name of the access source apparatus 100 being identified.

A notification unit 11 generates the processing rules to be informed to the forwarding nodes, based on the access source information identified.

Figure 4:
FIG. 4 is a diagram showing an example access log.
Figure 5:
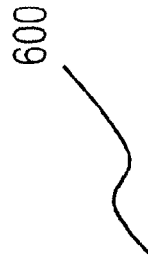
FIG. 5 is a tabulated diagram showing a decision reference table used for determining access limitations.

An example operation of the determining unit 10 will now be illustrated using FIGS. 4 and 5. FIG. 4 shows an example access log for the communication terminal 1 and FIG. 5 shows example decision criteria used by the determining unit 10 in determining the processing operations the network system 2 is caused to execute.

FIG. 4 shows an access log 500 in which the access hysteresis to the communication terminal 1 has been recorded in the chronological sequence. For example, '99.99.99.99' on a row 01 of the access log 500 is an IP address of an apparatus that accesses the communication terminal 1. '15/Jun/2011: 10:40:31+0900' on the same row 01 denotes the time the communication terminal 1 was accessed from the apparatus of the IP address (99.99.99.99). "GET/index.html" on the same row 01 indicates a URL of an HTML page within the communication terminal 1 accessed by the access source apparatus. The statement format of the access log 500 of FIG. 4 is merely illustrative and may be of any other suitable format. For example, a MAC address, a machine name or the like may be stated together with the IP address of the access source.

FIG. 5 shows example decision criteria used by the determining unit 10 in determining the processing operations to be executed by the network system 2, using the access log 500 of FIG. 4. A decision criteria table 600 of FIG. 5 is a table in which there are pre-registered criteria values used by the determining unit 10 in determining an access source whose access is to be refused. For example, a row 1 of the decision criteria table 600 shows a condition: 'access source arbitrary; access destination being "/index.html"; the number of times of access being 5; no time interval'. The determining unit 10 refers to the access log 500 of FIG. 4 to check to see if there is any access source apparatus that hits under this condition. It should be noted that "-" in the decision criteria table 600 indicates that no specified condition value is to be set, viz., that the entry in question is not to be used as a condition. It should also be noted that the user of the communication terminal 1 may newly add, correct or delete the entry values of the decision criteria table 600.

The access log 500 of FIG. 4 indicates that access from the access source apparatus having the IP address '99.99.99.99' to "/index.html" is repeatedly made. In this case, the determining unit 10 sequentially checks the access log 500 from the row 01 on until it determines at row 06 of the access log 500 that the condition of row 1 of the decision criteria table of FIG. 5 has been met. To refuse the access of the access source to the communication terminal 1, the determining unit 10 sends its IP address '99.99.99.99' to the notification unit 11.

The determining unit 10 may not use the above mentioned decision criteria table 600, in which case a user, such as a server supervisor, may monitor the access log to identify the information such as IP address of the access source to send the so identified information to the control apparatus 400.

In case the communication terminal 1 is a computer of, for example, a Web server, the access log 500 may not be used and, in its stead, the information of IPTables (software of Linux, registered trademark), a software item to implement packet filtering, may be used. In case the communication terminal 1 is a firewall, the access log information, possessed by the firewall, may be used. Any other suitable information to help specify the access source may also be used.

On receipt of the information, such as IP address, with the tenor to refuse the access, from the determining unit 10, the notification unit 11 forms a set of processing rules to refuse forwarding of packets between the access source of the IP address received and the communication terminal 1. The notification unit sets the so formed processing rules in at least one of the forwarding nodes 200, 210 and 220.

The set of the processing rules is set in at least one selected from among the forwarding nodes 200, 210 and 220. For example, the notification unit 11 may set the processing rules in the forwarding node closest to the communication terminal 1 (forwarding node 220 in FIG. 2). In case the position relationship of the forwarding nodes has been grasped, the notification unit 11 may set the processing rules in the forwarding node closest to the access source apparatus 100 (forwarding node 210 in FIG. 2).

The notification unit 11 may donate the term of validity to the processing rules and then send them to the forwarding nodes. The processing rules become non-valid after lapse of the term of validity. The notification unit 11 may command the forwarding node to delete the once-set processing rules after lapse of predetermined time. When the processing rules as set in the forwarding nodes become non-valid or are deleted, access limitations to the communication terminal 1, placed on the access source apparatus 100, are canceled.

Figure 6:
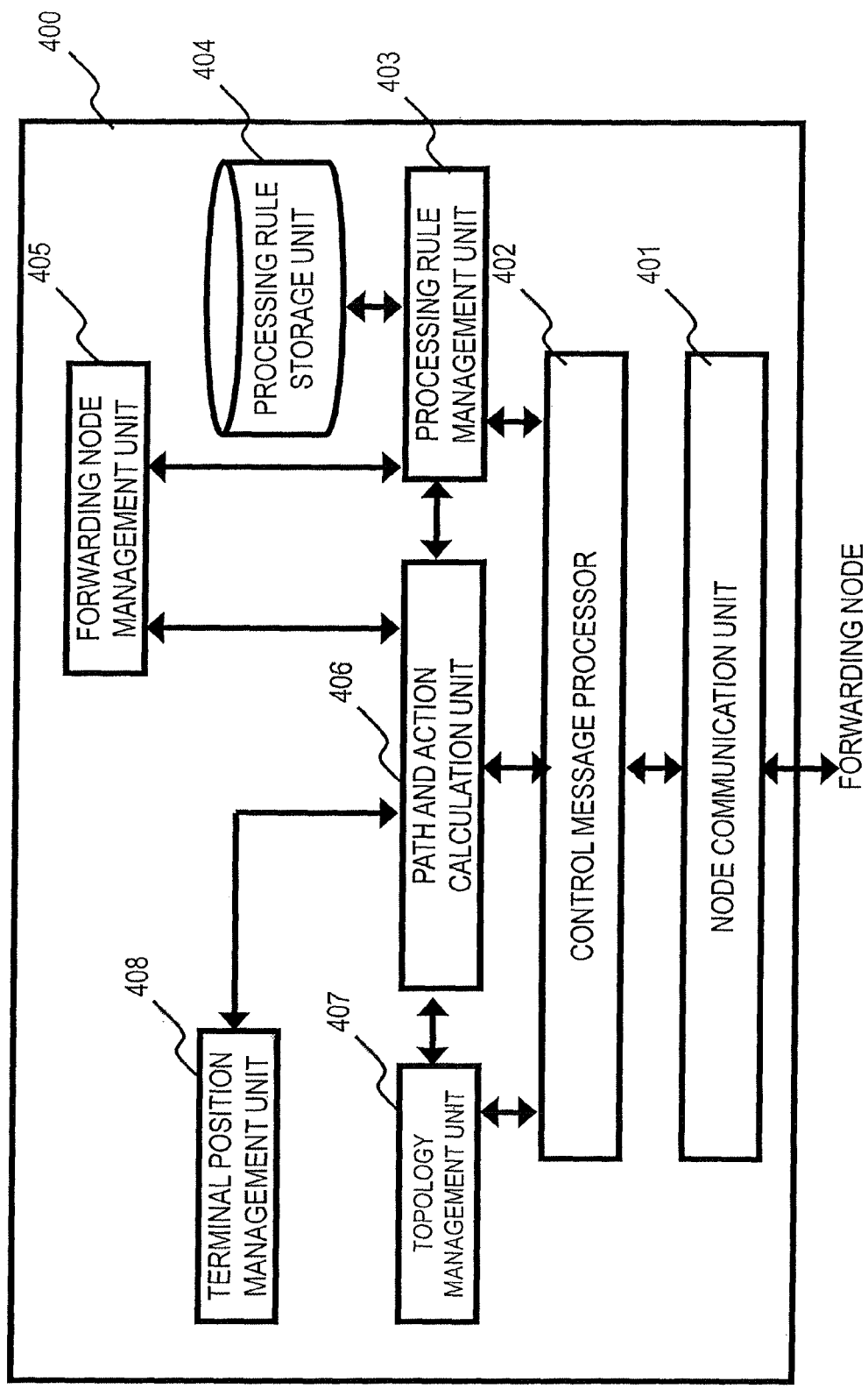
FIG. 6 is a block diagram showing an example configuration of a control apparatus 400.

FIG. 6 shows an example configuration of the control apparatus 400 of the first exemplary embodiment. Referring to FIG. 6, the control apparatus 400 includes a node communication unit 401 to establish communication between it and the forwarding nodes 200, 210 and 220. The control apparatus 400 also includes a control message processing unit 402, a processing rule management unit 403, a processing rule storage unit 404, a forwarding node management unit 405, a path and action calculation unit 406, a topology management unit 407 and a terminal position management unit 408.

The control message processing unit 402 analyzes a control message received from the forwarding node, and delivers the information on the control message to a relevant one of processing means within the control apparatus 400.

The processing rule management unit 403 manages which processing rule has been set in which forwarding node(s). The processing rule management unit 403 registers the processing rules, generated by the path and action calculation unit 406, in the processing rule storage unit 404, and sets them in the forwarding node(s). The processing rule management unit 403 also updates the information registered in the processing rule storage unit 404 to cope with a situation in which the processing rules as set in the forwarding node(s) have been modified by e.g., a notification of deletion of the processing rules from the forwarding node(s).

The forwarding node management unit 405 manages the capability of the forwarding nodes, controlled by the control apparatus 400, such as the number or sorts of the ports or the sorts of the actions to be supported.

On receipt of a request for setting the processing rules from the forwarding node, the path and action calculation unit 406 forms a forwarding path for a packet of interest, and a set of processing rules corresponding to the forwarding path, based on the packet information contained in the processing rule setting request.

The path and action calculation unit 406 calculates the packet forwarding path, based on the position information of the communication terminal managed by the terminal position management unit 408 and on the network topology information constructed by the topology management unit 407. The path and action calculation unit 406 acquires e.g., the port information of the forwarding nodes on the forwarding path from the forwarding node management unit 405. The path and action calculation unit 406 then determines the processing contents to be executed by the forwarding nodes on the forwarding path to implement the forwarding path calculated, and the matching rules to specify the flow to which to apply the processing contents.

The topology management unit 407 constructs the network topology information, based on the connection relationship among the forwarding nodes 200, 210 and 220 as collected via the node communication unit 401.

The terminal position management unit 408 manages the information to specify the positions of the communication terminal 1 or the access source apparatus 100 attached to the communication system. The explanation of the present exemplary embodiment will be made based upon the assumption that an IP address is used as the information that identifies the communication terminal 1 or the access source apparatus 100, and that identifiers of forwarding nodes, the communication terminal 1 or the access source apparatus 100 is attached to, or the information on their ports, are used as the information that identifies the position of the communication terminal 1 or the access source apparatus 100. It should be noted that the information to identify the communication terminal 1 or the access source apparatus 100, or the information to specify the location of the communication terminal 1 or the access source apparatus, is not limited to the above mentioned information.

The functions of the control apparatus 400, shown in FIG. 6, may be implemented by a computer program which is recorded on a computer-readable recording medium as a non-transitory medium.

The notification unit 11 may be changed to various configurations shown below. For example, the notification unit 11 may be configured by processing means having the functions equivalent to those of the control apparatus 400 shown in FIG. 6. Additionally, the notification unit 11 may inform the forwarding node about the processing rules which the control apparatus 400 permitted the notification unit to notify to the forwarding node. On the other hand, when informing the forwarding node about the processing rules, the notification unit 11 may request the control apparatus 400 to permit the notification unit to make such notification about the processing rules. When permitted by the control apparatus 400, the notification unit 11 may inform the forwarding node about the processing rules. If the notification unit has requested the control apparatus 400 to permit such notification but the processing rules decided on by the determining unit 10 has not been permitted, the notification unit 11 may notify the determining unit 10 of the fact that the processing operation as determined by the determining unit 10 has not been permitted. In case the processing rules decided on were not permitted, the determining unit 10 may newly decide on another processing.

The notification unit 11 may also select, from among processing rule candidates notified in advance from the control apparatus 400, the processing rules to be set at the forwarding node, and notify the forwarding node of the so selected processing rules. In case the processing rules corresponding to the processing decided on by the determining unit 10 are not contained in the processing rule candidates notified in advance from the control apparatus 400, the notification unit 11 may notify the determining unit 10 of the fact that there lack the corresponding processing rules. Again in this case, the determining unit 10 may newly decide on another processing.

For example, the notification unit 11 may generate processing rules, corresponding to the processing decided on by the determining unit 10, insofar as such processing rules are within the rights entrusted at the outset to the notification unit by the control apparatus 400.

The communication terminal 1 may download a software module, having a function equivalent to that of the notification unit 11, and inform the forwarding node about the processing rules using the so downloaded software module.

Figure 7:
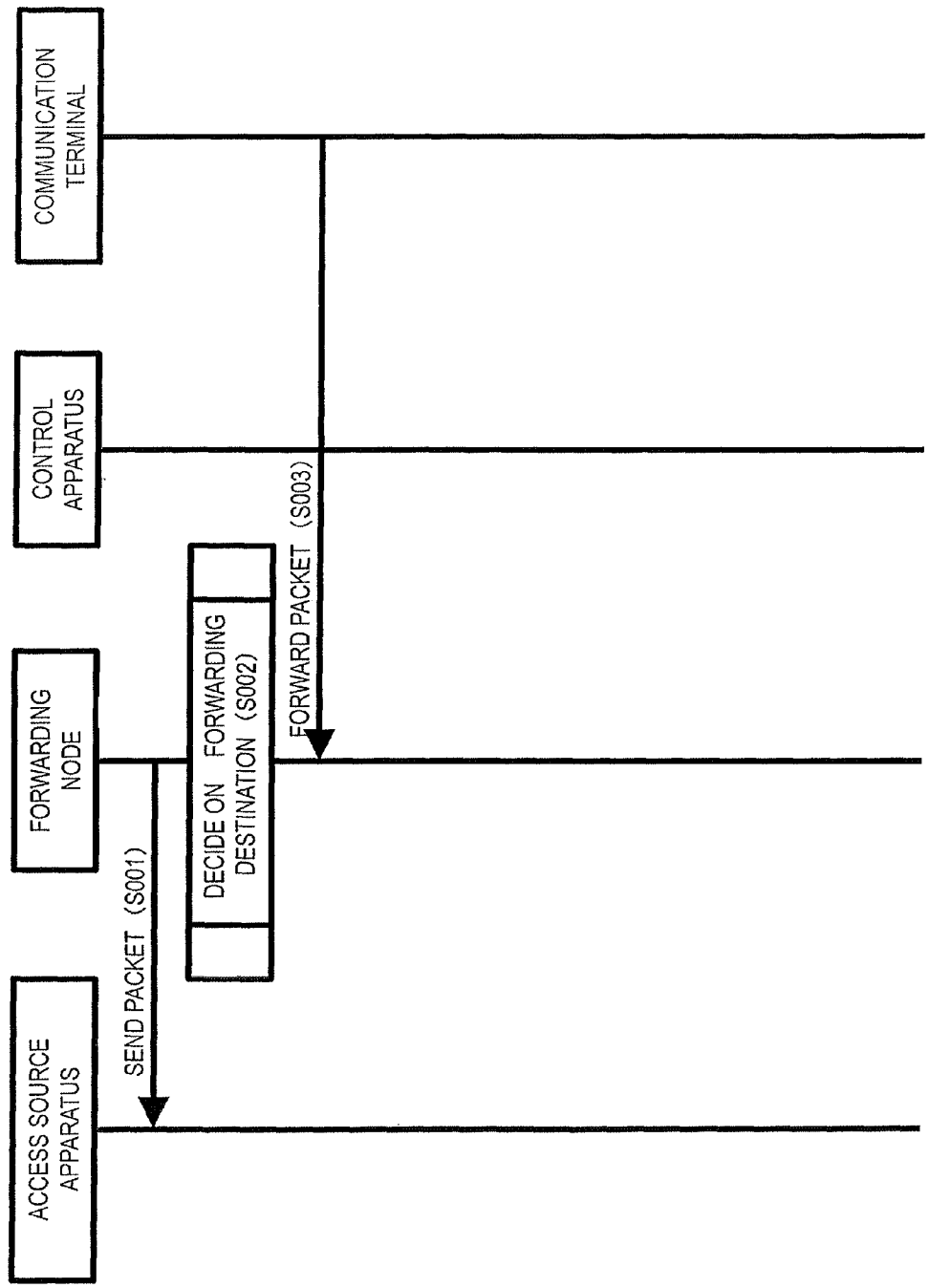
FIG. 7 is a diagram showing an example operation of the first exemplary embodiment.
Figure 8:
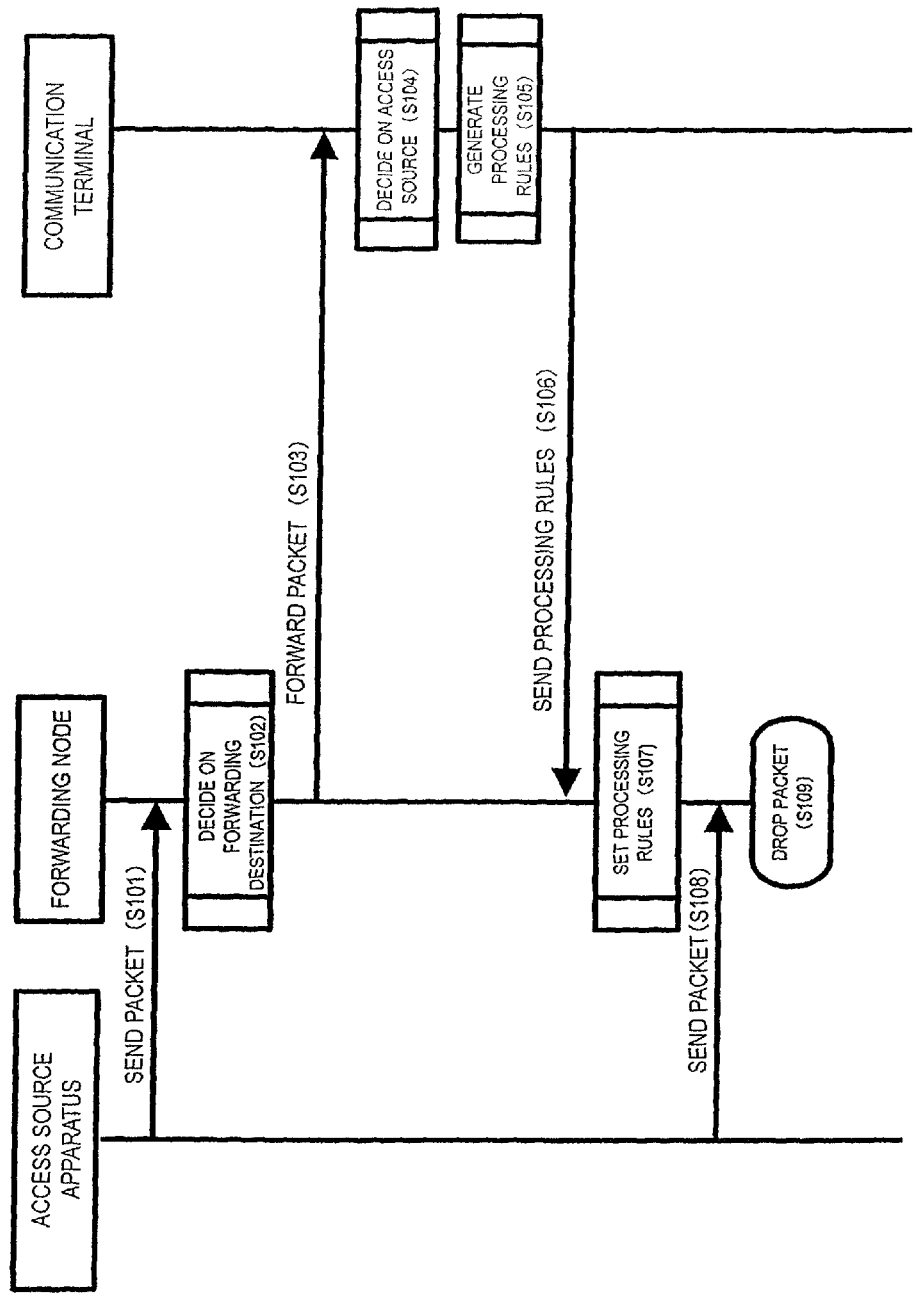
FIG. 8 is also a diagram showing an example operation of the first exemplary embodiment.

The operation of the present exemplary embodiment will now be described with reference to FIGS. 7 and 8 showing an example operation of the first exemplary embodiment.

First, referring to FIG. 7, the operation in which a packet sent from the access source apparatus 100 gets to the communication terminal 1 will be described.

When the access source apparatus 100 sends a packet to the communication terminal 1 (S001 of FIG. 7), the packet gets to a forwarding node (forwarding node 210 in FIG. 2).

The forwarding node decides on the forwarding destination of a packet received from the access source apparatus 100 (S002 of FIG. 7) and forwards the packet to the forwarding destination thus decided on (S003 of FIG. 7). In determining the forwarding destination of the packet, the forwarding node retrieves the processing rules, corresponding to the received packet, from among processing rules notified from the control apparatus 400. If the processing rules corresponding to the received packet have been found on retrieval, the forwarding node forwards the received packet in accordance with the processing rules thus found. In the case of FIG. 2, the forwarding node 210 forwards the packet, received from the access source apparatus 100, to the forwarding node 220, which forwarding node 220 forwards the packet, received from the forwarding node 210, to the communication terminal 1. The foregoing is the packet forwarding operation between the access source apparatus 100 and the communication terminal 1.

The operation in which the communication terminal 1 identifies the access source apparatus, whose access should be refused, and in which the communication terminal sets, in the forwarding node(s), the processing rules corresponding to the processing of controlling the access from the so identified access source apparatus, will now be explained with reference to FIG. 8.

Referring to FIG. 8, the access source apparatus 100 sends a packet to a forwarding node (step S101 of FIG. 8). The forwarding node determines the forwarding destination of the received packet (S102 of FIG. 8).

The packet sent from the access source apparatus 100 is forwarded by the forwarding nodes to the communication terminal 1, as in S001 to S003 of FIG. 7 (S103 of FIG. 8).

The communication terminal 1 determines the access source apparatus 100, an access from which should be refused, using the access log 500 shown in FIG. 4 and the decision criteria table 600 shown in FIG. 5 (S104 of FIG. 8). If there is an access source apparatus 100, an access from which should be refused, the communication terminal 1 extracts an IP address of the access source apparatus 100 from the access log 500, and sends the so extracted IP address as being the access source information to the notification unit 11. The notification unit 11 generates the processing rules to be set on the forwarding node based on the access source information received (S105 of FIG. 8). The notification unit 11 generates e.g., the processing rules to drop the packet sent to the communication terminal 1 from the access source apparatus 100 corresponding to the access source information received.

The notification unit 11 sends the processing rules, generated as described above, to at least one forwarding node, herein the forwarding node 220 of FIG. 2 (S106 of FIG. 8). The notification unit 11 may set the processing rules in the forwarding node 200 or 210. In case there is a plurality of forwarding nodes on the path from the access source apparatus 100 to the communication terminal 1, the notification unit 11 may set the processing rules in any of these nodes.

The forwarding node 220 receives the processing rules from the notification unit 11 to store the so received processing rules in a processing rule table of the processing rule storage unit (S107 of FIG. 8).

When the access source apparatus 100 again sends a packet to the communication terminal 1 (S108 of FIG. 8), the forwarding node drops (discards) the packet, sent from the access source apparatus 100, in accordance with the processing rules as set by the communication terminal 1 (S109 of FIG. 8).

It should be noted that the processing rules as set in the forwarding node may contain a rule a user, such as a server supervisor, has set by having reference to an access log of the communication terminal 1.

If the communication terminal 1 is a firewall, for example, and the accesses by packets refused are occurring frequently in the firewall, the processing rules to drop the packets including the IP address of the access source that sent the so refused packets may be set in the forwarding node. The processing load on the firewall may then be reduced.

Moreover, in case the communication terminal 1 is an authentication server, represented by, for example, RADIUS, the processing rules to drop the accesses, the authentication of which always failed in the authentication server, may be formed and set in the forwarding node. The processing load on the communication terminal 1, an authentication server, may then be reduced.

In case the communication terminal 1 is a Web server, there may be provided such decision criteria running: "The Web page browsing is allowed up to 1,000 views/sec and, in excess of this limitation, Web page browsing is refused to reduce the load on the Web server" or "the Web page browsing is allowed up to 10 views/sec and, in excess of this limitation, Web page browsing is refused to reduce the load on the Web server." In-depth setting may then be made in conformity to the decision criteria and, in conformity to the in-depth setting, the processing rules may be prepared in the control apparatus 400 and set in the forwarding node, thereby reducing the processing load otherwise imposed on the communication terminal 1.

Second Exemplary Embodiment

A second exemplary embodiment, in which the communication terminal is modified, will now be explained. In the second exemplary embodiment, a communicating terminal 1 causes a network system 2 to execute pre-set processing in response to the communication volume.

Figure 9:
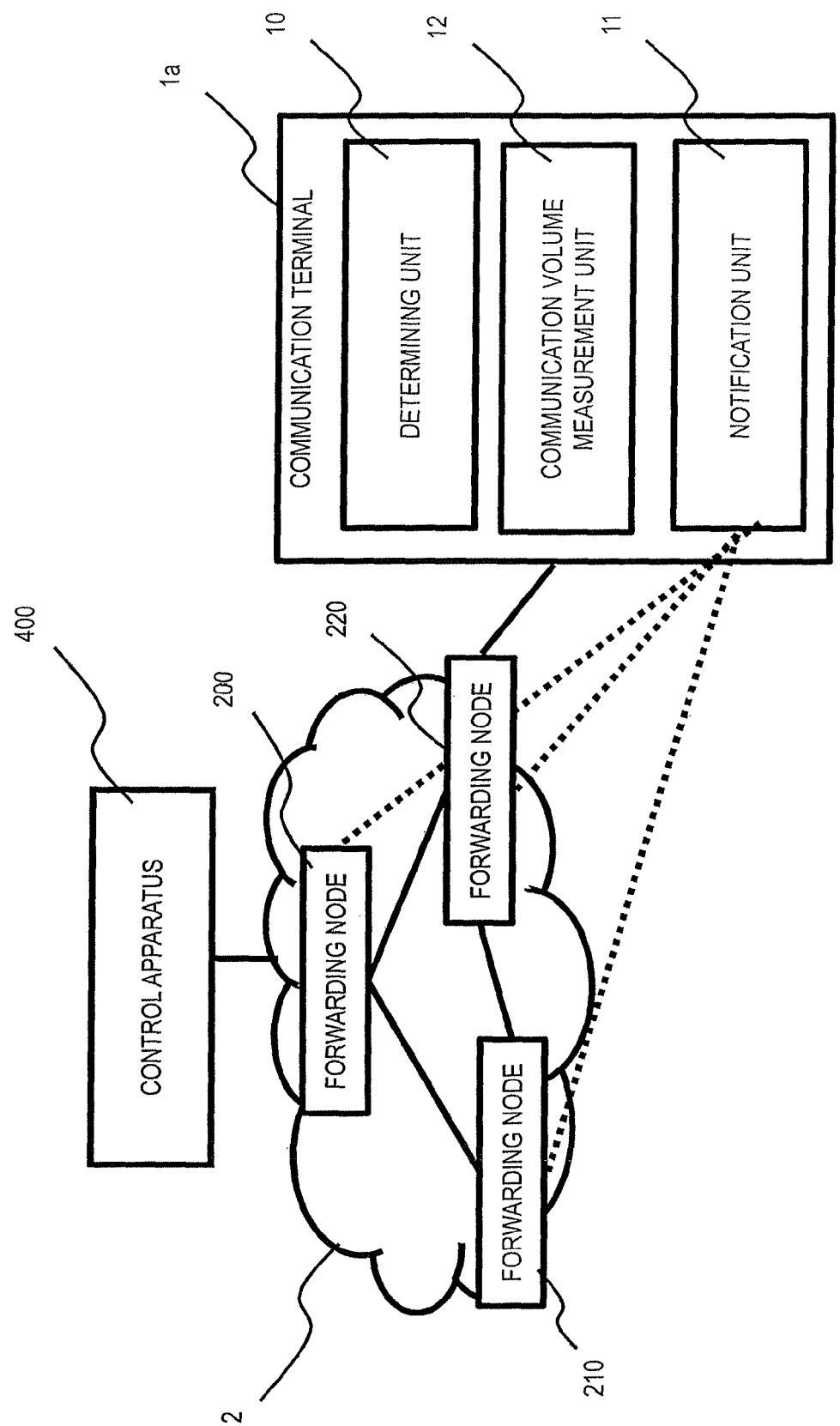
FIG. 9 is a schematic view showing an example system configuration according to a second exemplary embodiment of the present invention.

FIG. 9 shows an example system configuration of the second exemplary embodiment. Referring to FIG. 9, there is shown a configuration including a communication terminal 1a corresponding to the communication terminal 1 added by a communication volume measurement unit 12. The system configuration of FIG. 9 is merely illustrative and the system configuration of the present disclosure is not limited to the configuration shown in FIG. 9.

The communication volume measurement unit 12 monitors the communication volume between the communication terminal 1a and the network system 2. For example, the communication volume measurement unit 12 may monitor the number of packets sent/received by the communication terminal 1a. The communication volume measurement unit 12 may also monitor the data volume sent/received by the communication terminal 1a. It should be noted that the method for the communication volume measurement unit 12 to monitor the communication volume is not limited to these illustrative methods.

The determining unit 10 determines the processing to be executed by the network system 2 based on the communication volume as monitored by the communication volume measurement unit 12.

In case the communication volume has exceeded a pre-set threshold value, the determining unit 10 decides on the processing to change the communication route of transporting a packet to the communication terminal 1a to a narrow band communication path, as being the processing to be executed by the network system 2.

The notification unit 11 informs the forwarding node about the processing rules corresponding to the processing rules as decided on by the determining unit 10. The notification unit 11 determines the processing rules to be set in at least one of the forwarding nodes 200, 210 and 220, based on an identifier, such as IP address, of the communication terminal 1a as notified from the determining unit 10, and on the communication bandwidth. For example, the notification unit 11 generates processing rules so that a packet whose transport destination or transport source is the communication terminal 1a, viz., a packet in whose transport source or destination the identifier of the communication terminal 1a has been set, will be forwarded on a communication route of the communication bandwidth as indicated by the determining unit 10. The notification unit 11 notifies the so generated processing rules to the forwarding node(s) corresponding to the communication path.

The notification unit 11 may donate the term of validity to the processing rules to transmit them to the forwarding node(s). The processing rules become non-valid after lapse of the term of validity. The notification unit 11 may also instruct the forwarding node(s) to delete the once set processing rules after lapse of the pre-set time. After the processing rules set on the forwarding node(s) become non-valid or are deleted, the bandwidth of the forwarding path of packets, sent or received by the communication terminal 1a, reverts from the narrow bandwidth to a normal one.

The determining unit 10 may also decide on the processing to drop the packets, sent or received by the communication terminal 1a, as being the processing to be executed by the network system 2, in case the communication volume has exceeded a pre-set threshold value. The notification unit 11 generates a set of processing rules corresponding to the processing decided on by the determining unit 10. For example, the notification unit 11 generates a set of processing rules prescribing the processing contents of dropping the packet corresponding to the identifier (e.g. IP address) of the communication terminal 1a.

The notification unit 11 sets, in at least one of the forwarding nodes 200, 210, 220, a set of the processing rules prescribing dropping a packet whose transport destination or transport source is the communication terminal 1a (packet in which an IP address of the communication terminal 1a has been set as its destination or source of transport). On receipt of the packet, whose transport destination or transport source is the communication terminal 1a, the forwarding node(s) drops the received packet in accordance with the processing rules as set.

Again in this case, the notification unit 11 may donate the term of validity to the processing rules to then transport the rules to the forwarding node(s). The processing rules become non-valid after lapse of the term of validity. The notification unit 11 may also instruct the forwarding node(s) to delete the once set processing rules after lapse of the pre-set time. After the processing rules set on the forwarding node(s) become non-valid or are deleted, the packet, whose transport destination or transport source is the communication terminal 1, is not dropped but forwarded.

In addition, the determining unit 10 may decide on the processing to be executed by the network system 2 as the time zones as well as the communication volume are taken into account. For example, in case the communication volume exceeds a pre-set threshold value and the time zone is the particular time zone, the determining unit 10 may cause the network system 2 to execute the processing to drop packets whose transport destination or transport source is the communication terminal 1, or the processing to retreat packets, whose transport destination or the transport source is the communication terminal 1a, to a narrow band transport route.

With the second exemplary embodiment, a user who exploits the communication terminal 1a under a measured service billing contract that uses the communication volume as the basis for billing may readily manage billing in conformity to the communication volume. For example, if the user has set a threshold value of the communication volume in the communication terminal 1a, the communication terminal may cause the network system 2 to execute the processing of dropping the packet, based on the so set threshold value, in relation with the traffic of the communication terminal 1a. Since the processing is carried out by the network system 2, acting as proxy for the communication terminal 1a, the load otherwise imposed on the communication terminal 1a in dropping the packet may be reduced.

On the other hand, if the user uses, for example, the communication terminal 1a under a contract which is basically of the measured service billing system (the billing system which conforms to the communication volume) but which transfers to a fixed amount plan system in case the route used is the narrow band route, he/she may readily manage the billing in conformity to the communication volume. For example, if the user sets a threshold value of the communication volume in the communication terminal 1a, the communicating terminal 1a may cause the network system 2 to execute the processing to retreat the packet involved in the traffic of the communicating terminal 1a to a narrow band communication route based on the so set threshold value. Since the processing is executed by the network system 2, acting as proxy, the load otherwise imposed on the communication terminal 1a in dropping the packet may be reduced.

Third Exemplary Embodiment

A third exemplary embodiment, in which the communication terminal is modified, will now be explained. In the third exemplary embodiment, a communicating terminal 1 causes a network system 2 to execute the processing of packet filtering.

Figure 10:
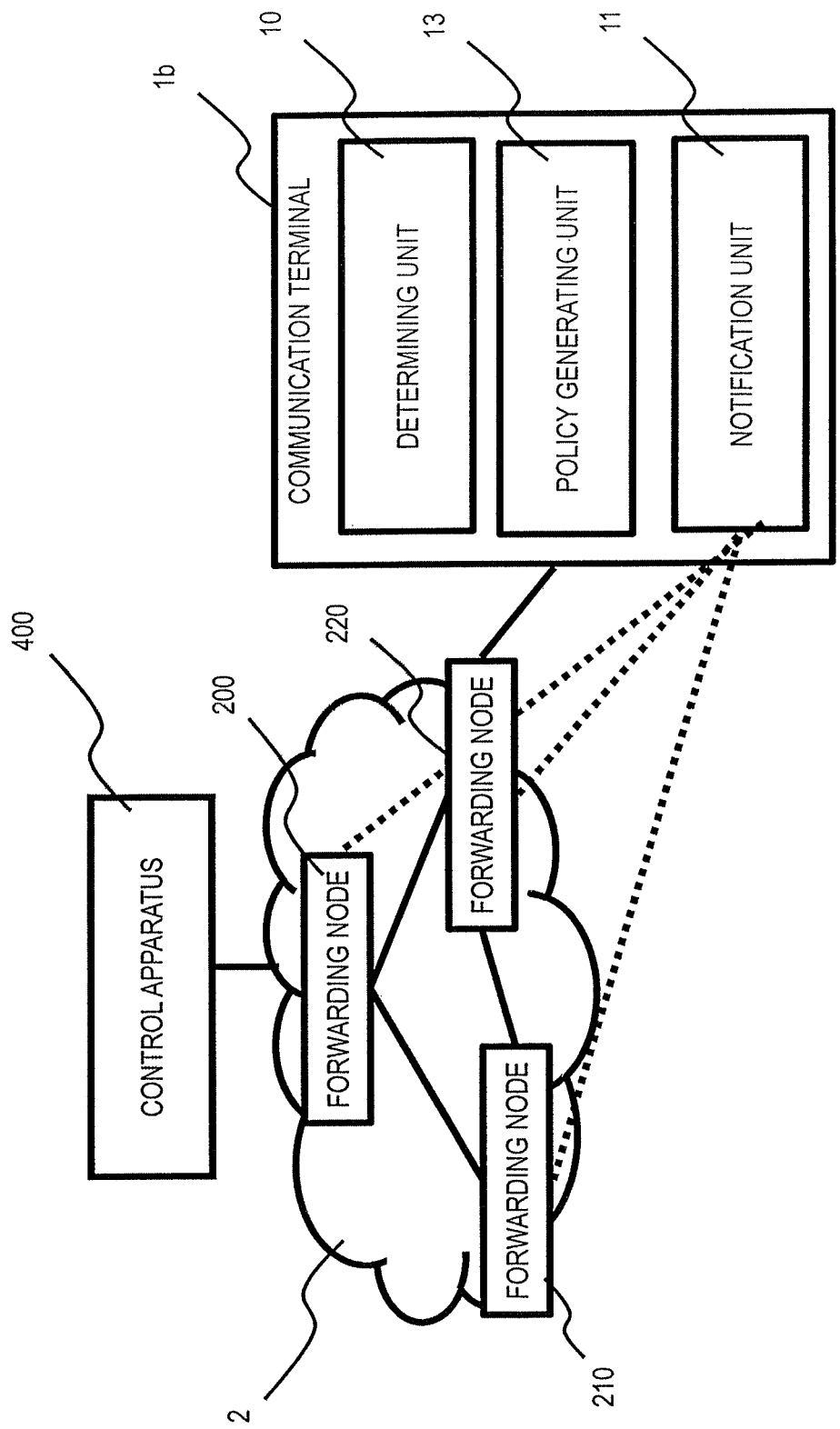
FIG. 10 is a schematic view showing an example system configuration according to a third exemplary embodiment of the present invention.

FIG. 10 shows an example system configuration of the third exemplary embodiment. Referring to FIG. 10, there is shown a configuration including a communication terminal 1b corresponding to the communication terminal 1 of the exemplary embodiment 1 added by a policy generating unit 13. The system configuration of FIG. 10 is merely illustrative such that the system configuration of the present disclosure is not limited to the configuration shown in FIG. 10.

The policy generating unit 13 generates a policy for packet filtering. For example, the policy generating unit 13 generates a filtering policy, such as 'permit' or 'refuse' of communication, in connection with a variety of conditions for packet identification, such as transport source IP address, transport destination IP address, port number or protocol sorts, such as TPC. For example, the policy generating unit 13 generates a policy to 'permit' communication of a packet whose transport source IP address is "10.20.30.40" or a policy to 'refuse' communication of a packet whose port number is '1024' and whose transport source IP address is "11.21.31.41."

The determining unit 10 decides on a policy for the network system 2 to execute packet filtering, from among the policies generated by the policy generating unit 13. It should be noted that the determining unit 10 may also decide that the packet filtering is to be executed by the network system 2 based on all policies generated by the policy generating unit 13.

The notification unit 11 generates processing rules to be set on the forwarding node based on the policy determined by the determining unit 10. For example, the notification unit 11 generates a set of processing rules to block, e.g., drop, a packet whose port number is "1024" and whose transport source IP address is "11.21.31.41." The notification unit 11 informs an arbitrary forwarding node about the processing rules generated. For example, the notification unit 11 sets processing rules in the forwarding node(s) the communication terminal 1 is attached to. For example, the notification unit 11 may also set the processing rules, corresponding to a plurality of policies, in a plurality of forwarding nodes in a distributed manner.

In this case, the notification unit 11 may set in the forwarding nod(s) only the processing rules corresponding to the policy that 'refuses' the packet, out of the policies as determined by the determining unit 10.

The forwarding node(s) executes the processing of packet filtering in accordance with the so set processing rules.

In the communication terminal 1 of the third exemplary embodiment, the packet filtering processing, which it should execute, may be executed by the network system 2 acting as proxy. The communication terminal 1 may thus be freed of load involved in the packet filtering processing, depending on the policies.

Although the description has been made of preferred exemplary embodiments, such exemplary embodiments are given only by way of illustration and are not intended to limit the scope of the invention. That is, further modifications, substitutions or adjustments may be made without departing from the basic technical concept of the present invention. For example, the above described exemplary embodiments may be combined together.

The disclosure of the aforementioned Patent Literature and the Non-Patent Literatures is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

1, 1a, 1b communication terminals
2 network system
10 determining unit
11 notification unit
12 communication volume measurement unit
13 policy generating unit
100 access source apparatus
200, 210, 220 forwarding nodes
400 control apparatus
401 node communication unit
402 control message processing unit
403 processing rule management unit
404 processing rule storage unit
405 forwarding node management unit
406 path and action calculation unit
407 topology management unit
408 terminal position management unit
500 access log
600 decision criteria table

The invention claimed is:

1. A communication terminal comprising:
a router that communicates with a network system including a forwarding apparatus forwarding a packet and a control apparatus informing the forwarding apparatus of a processing rule prescribing a packet processing method;
at least one controller that determines a processing operation to be executed by the network system instead of the communication terminal from among packet processing operations, wherein the packet processing operations were originally to be executed by the communication terminal which takes the place of the control apparatus to inform the forwarding apparatus of a processing rule corresponding to the determined packet processing operation.

2. The communication terminal according to claim 1, wherein
the at least one controller is responsive to permission from the control apparatus to inform the forwarding apparatus of the processing rule corresponding to the determined packet processing operation.

3. The communication terminal according to claim 1, wherein,
the at least one controller informs the forwarding apparatus of a pre-set processing rule that is allowed by the control apparatus to be set in the forwarding apparatus.

4. The communication terminal according to claim 1, wherein
the at least one controller selects a processing rule corresponding to the determined packet processing operation from pre-set processing rules notified from the control apparatus and informs the forwarding apparatus of the selected processing rule.

5. The communication terminal according to claim 1, wherein,
the at least one controller informs the forwarding apparatus of the processing rule based on a right entrusted from the control apparatus.

6. The communication terminal according to claim 1, wherein
the at least one controller receives a module that sets the processing rule in the forwarding apparatus and informs the forwarding apparatus of the processing rule using the module.

7. The communication terminal according to claim 1, wherein
the at least one controller determines based on a pre-set policy the processing operation to be executed by the network system.

8. The communication terminal according to claim 1, wherein
the at least one controller determines based on load on the communication terminal the processing operation to be executed by the network system.

9. The communication terminal according to claim 1, wherein
the at least one controller determines based on an access volume to the communication terminal the processing operation to be executed by the network system.

10. The communication terminal according to claim 1, wherein
the at least one controller determines based on a communication volume in the communication terminal the processing operation to be executed by the network system.

11. The communication terminal according to claim 1, wherein
the at least one controller determined as the processing operation to be executed by the network system a processing operation to limit access to the communication terminal.

12. The communication terminal according to claim 1, wherein
the at least one controller determines as the processing operation to be executed by the network system a processing operation to control bandwidth of a communication path of a packet regarding the communication terminal.

13. The communication terminal according to claim 1, wherein
the at least one controller determines as the processing operation to be executed by the network system a processing operation to filter a packet related to the communication terminal.

14. A method of communication, by a communication terminal communicating with a network system that includes a forwarding apparatus forwarding a packet and a control apparatus informing the forwarding apparatus of a processing rule prescribing a packet processing method, the method comprising:
determining a processing operation to be executed by the network system instead of the communication terminal from among packet processing operations, wherein the packet processing operations were originally to be executed by the communication terminal; and
the communication terminal taking the place of the control apparatus to inform the forwarding apparatus of a processing rule corresponding to the determined packet processing operation.

15. The communication method according to claim 14, wherein
the informing is performed as informing, responsive to permission from the control apparatus, the forwarding apparatus of the processing rule corresponding to the determined packet processing operation.

16. The communication method according to claim 14, wherein
the informing is performed as informing the forwarding apparatus of a pre-set processing rule that is allowed by the control apparatus to be set in the forwarding apparatus.

17. The communication method according to claim 14, wherein the informing is performed as selecting a processing rule corresponding to the determined processing operation from pre-set processing rules notified from the control apparatus and informing the forwarding apparatus of the selected processing rule.

18. The communication method according to claim 14, wherein
the informing is performed as informing the forwarding apparatus of the processing rule based on a right entrusted from the control apparatus.

19. The communication method according to claim 14, wherein
the informing is performed as receiving a module that sets the processing rules in the forwarding apparatus and informing the forwarding apparatus of the processing rule using the module.

20. The communication method according to claim 14, wherein
the determining is performed as determining based on a pre-set policy the processing operation to be executed by the network system.

21. The communication method according to claim 14, wherein
the determining is performed as determining based on load on the communication terminal the processing operation to be executed by the network system.

22. The communication method according to claim 14, wherein
the determining is performed as determining based on an access volume to the communication terminal the processing operation to be executed by the network system.

23. The communication method according to claim 14, wherein
the determining is performed as determining based on a communication volume in the communication terminal the processing operation to be executed by the network system.

24. The communication method according to claim 14, wherein
the determining is performed as determining as the processing operation to be executed by the network system a processing operation to limit access to the communication terminal.

25. The communication method according to claim 14, wherein
the determining is performed as determining as the processing operation to be executed by the network system a processing operation to limit bandwidth of a communication path of packets regarding the communication terminal.

26. The communication method according to claim 14, wherein
the determining is performed as determining as the processing operation to be executed by the network system a processing operation to filter a packet related to the communication terminal.

27. A communication system comprising:
a forwarding apparatus that forwards a packet;
a control apparatus that informs the forwarding apparatus of a processing rule prescribing a packet processing method; and
a communication terminal, wherein the communication terminal comprises:
a router that communicates with a network system including the forwarding apparatus and the control apparatus; and
at least one controller that determines a processing operation to be executed by the network system instead of the communication terminal from among packet processing operations, wherein the packet processing operations were originally to be executed by the communication terminal which takes the place of the control apparatus to
inform the forwarding apparatus of a processing rule corresponding to the determined packet processing operation.

\* \* \* \* \*